(12) United States Patent
Li

(10) Patent No.: US 9,342,285 B2
(45) Date of Patent: May 17, 2016

(54) METHOD AND APPARATUS FOR DETECTING CODE CHANGE

(71) Applicant: Huawei Technologies Co., Ltd., Shenzhen (CN)

(72) Inventor: Jun Li, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/088,658

(22) Filed: Nov. 25, 2013

(65) Prior Publication Data

US 2014/0157232 A1    Jun. 5, 2014

Related U.S. Application Data

(63) Continuation of application No. PCT/CN2013/074723, filed on Apr. 25, 2013.

(30) Foreign Application Priority Data

Nov. 30, 2012    (CN) .......................... 2012 1 0504577

(51) Int. Cl.
*G06F 9/44* (2006.01)
*G06F 9/45* (2006.01)
*G06F 9/445* (2006.01)

(52) U.S. Cl.
CPC .. *G06F 8/48* (2013.01); *G06F 8/67* (2013.01); *G06F 8/68* (2013.01)

(58) Field of Classification Search
CPC ................. G06F 8/48; G06F 8/67; G06F 8/68
See application file for complete search history.

(56) References Cited

U.S. PATENT DOCUMENTS 5,182,806 A * 1/1993 McKeeman .............. G06F 8/48
714/38.1

(Continued)

FOREIGN PATENT DOCUMENTS

CN    1475909 A    2/2004
CN    101916194 A    12/2010

(Continued)

OTHER PUBLICATIONS

Anthony Cox et al. "Relocating XML Elements from Preprocessed to Unprocessed Code", [Online], IEEE 2002, pp. 1-10, [Retrieved from Internet on Dec. 1, 2015], <http://ieeexplore.ieee.org/stamp/stamp.jsp?tp=&arnumber=1021344>.*

(Continued)

*Primary Examiner* — Thuy Dao
*Assistant Examiner* — Ziaul A Chowdhury
(74) *Attorney, Agent, or Firm* — Conley Rose, P.C.; Grant Rodolph

(57) ABSTRACT

The present invention provides a method and an apparatus for detecting a code change. The method includes adding a tag to a function to be changed in a source code, and compiling the source code to acquire, according to the tag, position information and relocation information of the function to be changed in the compiled source code. In embodiments of the present invention, a tag is added to a function to be changed, a source code is compiled into a binary file, and position information and relocation information of the function to be changed in the binary file are acquired by using the tag, so that in subsequent operations, a hot patch file modifies, according to the position information and the relocation information, the function to be changed in software.

11 Claims, 3 Drawing Sheets

(56) References Cited

U.S. PATENT DOCUMENTS

| | | | | |
|---|---|---|---|---|
| 5,764,992 | A * | 6/1998 | Kullick | G06F 8/67 717/170 |
| 6,311,327 | B1 * | 10/2001 | O'Brien et al. | 717/114 |
| 6,654,953 | B1 * | 11/2003 | Beaumont et al. | 717/158 |
| 7,895,515 | B1 * | 2/2011 | Oliver | G06F 17/30908 715/234 |
| 8,589,880 | B2 * | 11/2013 | Jones et al. | 717/124 |
| 8,607,208 | B1 * | 12/2013 | Arnold | G06F 8/67 717/129 |
| 2003/0005408 | A1 * | 1/2003 | Tumati | G06F 8/67 717/110 |
| 2003/0115574 | A1 * | 6/2003 | Garvey | 717/120 |
| 2004/0062130 | A1 * | 4/2004 | Chiang | G06F 8/68 365/230.03 |
| 2006/0015856 | A1 | 1/2006 | Lotter | |
| 2009/0113386 | A1 * | 4/2009 | Eker | G06F 8/68 717/108 |
| 2009/0187725 | A1 | 7/2009 | Mencias et al. | |
| 2010/0065636 | A1 * | 3/2010 | Byun et al. | 235/435 |
| 2010/0269105 | A1 | 10/2010 | Arnold | |
| 2011/0165859 | A1 * | 7/2011 | Wengrovitz | H04M 1/7253 455/411 |
| 2011/0167409 | A1 | 7/2011 | Schadow | |
| 2011/0307875 | A1 * | 12/2011 | Xu et al. | 717/151 |
| 2012/0198169 | A1 * | 8/2012 | Chen et al. | 711/125 |

FOREIGN PATENT DOCUMENTS

| | | | |
|---|---|---|---|
| CN | 102279749 | A | 12/2011 |
| CN | 102479265 | A | 5/2012 |
| EP | 1808764 | A1 | 7/2007 |

OTHER PUBLICATIONS

Prateek Saxena et al., "Efficient Fine-Grained Binary Instrumentation with Applications to Taint-Tracking", [Online], ACM 2008, pp. 74-83, [Retrieved from Internet on Dec. 1, 2015], <http://delivery.acm.org/10.1145/1360000/1356069/p74-saxena.pdf>.*

Margaret-Anne Storey et al, "Waypointing and Social Tagging to Support Program Navigation", [Online], ACM 2006, pp. 1367-1372, [Retrieved from Internet on Dec. 1, 2015], <http://delivery.acm.org/10.1145/1130000/1125704/p1367-storey.pdf>.*

Irene Zhang et al., "Customizable and Extensible Deployment for Mobile/Cloud Applications", [Online], 2014, pp. 97-112, [Retrieved from Internet on Dec. 1, 2015], <https://www.usenix.org/system/files/conference/osdi14/osdi14-paper-zhang.pdf>.*

Altekar, G., et al., "OPUS: Online Patches and Updates for Security," 14th USENIX Security Symposium, Aug. 2005, pp. 287-302.

Foreign Communication From a Counterpart Application, PCT Application No. PCT/CN2013/074723, Chinese Search Report dated Aug. 29, 2013, 6 pages.

Foreign Communication From a Counterpart Application, PCT Application No. PCT/CN2013/074723, Chinese Search Report dated Aug. 29, 2013, 5 pages.

Foreign Communication From a Counterpart Application, European Application No. 13779107.5, Extended European Search Report dated Dec. 11, 2014, 6 pages.

Foreign Communication From A Counterpart Application, Chinese Application No. 2012105045777, Chinese Search Report dated Dec. 7, 2015, 2 pages.

Foreign Communication From A Counterpart Application, Chinese Application No. 2012105045777, Chinese Office fiction dated Jan. 4, 2016, 4 pages.

* cited by examiner

METHOD AND APPARATUS FOR DETECTING CODE CHANGE

CROSS-REFERENCE TO RELATED APPLICATION

This application is a continuation of International Application No. PCT/CN2013/074723, filed on Apr. 25, 2013, which claims priority to Chinese Patent Application No. 201210504577.7, filed on Nov. 30, 2012, both of which are hereby incorporated by reference in their entireties.

TECHNICAL FIELD

The present disclosure relates to the field of computers, and in particular, to a method and an apparatus for detecting a code change.

BACKGROUND

During development and use of software, various potential problems are often encountered, and a general solution to these problems is creating a patch of a source code level for the software. A hot patch is a code capable of fixing software vulnerabilities, and it has the following feature: running of the software is not interrupted and only functions to be changed in the source code need to be modified or replaced, that is, a program is analyzed to find out which function codes are changed, so that these function codes can be replaced. During the operation, functions are replaced to achieve a hot patch effect.

In the prior art, a method for identifying and locating a changed program code is divided into two different implementation solutions: one solution is identifying a changed program code by analyzing and comparing a difference between source codes of different versions and the other solution is identifying a changed program code by comparing binary files acquired after compiling of the programs. The first solution is relatively complex and has a lot of limitations, for example, a final compilation effect of an inline type function cannot be known, so that effective changed function codes cannot be extracted and the accuracy of identification cannot be ensured. In the second solution, both a program before patching and a program after patching need to be compiled, and then compiled binary codes are compared, which is relatively complex and time-consuming. In addition, this solution needs to use a lot of compiler options, some of the compiler options may conflict, so that the reliability of identification is affected.

SUMMARY

An objective of embodiments of the present disclosure is to provide a method and an apparatus for detecting a code change, so as to detect and identify a changed code more efficiently, reduce the complexity of identification, and increase the accuracy and reliability of identification.

In a first aspect, an embodiment of the present disclosure provides a method for detecting a code change, where the method includes: adding a tag to a function to be changed in a source code, where the tag is used to locate the function to be changed in a binary file obtained after the source code is compiled; and compiling the source code into a binary file to acquire, according to the tag, position information and relocation information of the function to be changed in the binary file.

In a first possible implementation manner of the first aspect, adding a tag to a function to be changed in a source code includes: creating a tag including an external interface, where the tag is a code or a macro for extracting information; and adding, by using the external interface, the tag to the function to be changed in the source code.

In a second possible implementation manner of the first aspect, acquiring, according to the tag, position information and relocation information of the function to be changed in the binary file includes: executing the tag to acquire information of the function to be changed in the binary file, comparing the information with a symbol table in the binary file, and acquiring, according to a comparison result, the position information of the function to be changed in the binary file, where the information of the function to be changed in the binary file includes a function name of the function to be changed in the binary file or a start address of the function to be changed in the binary file; and adding a compilation attribute to the function to be changed, where the added compilation attribute is used to store the function to be changed in an independent segment of the binary file, and compiling, according to the compilation attribute, the source code into a binary file again to acquire the relocation information of the function to be changed in the binary file.

With reference to the second possible implementation manner of the first aspect, in a third possible implementation manner, comparing the information with a symbol table in the binary file, and acquiring, according to a comparison result, the position information of the function to be changed in the binary file includes: if the information is the function name of the function to be changed in the binary file, comparing the function name of the function to be changed in the binary file with the symbol table in the binary file to acquire the start address of the function to be changed in the binary file; if the information is the start address of the function to be changed in the binary file, comparing the start address of the function to be changed in the binary file with the symbol table in the binary file to acquire the function name of the function to be changed in the binary file; and using the function name and the start address of the function to be changed in the binary file as the position information of the function to be changed in the binary file.

In a second aspect, an embodiment of the present disclosure provides an apparatus for detecting a code change, where the apparatus includes a tag adding unit, configured to add a tag to a function to be changed in a source code, where the tag is used to locate the function to be changed in a binary file obtained after the source code is compiled; a compiling unit, configured to compile the source code with the tag added by the tag adding unit into a binary file; and an information acquiring unit, configured to acquire, according to the tag added by the tag adding unit, position information and relocation information of the function to be changed in the binary file compiled by the compiling unit.

In a first possible implementation manner of the second aspect, the tag adding unit includes a tag creating subunit, configured to create a tag including an external interface, where the tag is a code or a macro for extracting information; and an adding subunit, configured to add, by using the external interface, the tag created by the tag creating subunit to the function to be changed in the source code.

In a second possible implementation manner of the second aspect, the information acquiring unit includes a position information acquiring subunit, configured to acquire, by using the tag, information of the function to be changed in the binary file, compare the information with a symbol table in the binary file, and acquire, according to a comparison result, the position information of the function to be changed in the binary file, where the information of the function to be changed in the binary file includes a function name of the function to be changed in the binary file or a start address of the function to be changed in the binary file; and a relocation information acquiring subunit, configured to add a compilation attribute to the function to be changed, where the added compilation attribute is used to store the function to be changed in an independent segment of the binary file, and compile, according to the compilation attribute, the source code into a binary file again to acquire the relocation information of the function to be changed in the binary file.

With reference to the second possible implementation method of the second aspect, in a third possible implementation method, the position information acquiring subunit is configured to, if the information acquired by using the tag is the function name of the function to be changed in the binary file, compare the function name of the function to be changed in the binary file with the symbol table in the binary file to acquire the start address of the function to be changed in the binary file; if the information acquired by using the tag is the start address of the function to be changed in the binary file, compare the start address of the function to be changed in the binary file with the symbol table in the binary file to acquire the function name of the function to be changed in the binary file; and use the function name and the start address of the function to be changed in the binary file as the position information of the function to be changed in the binary file.

In the embodiments of the present disclosure, a tag is added to a function to be changed, a source code is compiled into a binary file, and position information and relocation information of the function to be changed in the binary file are acquired by using the tag, so that in subsequent operations, a hot patch file detects and identifies a changed code quickly according to the position information and the relocation information, and modifies the function to be changed in software. This eliminates the need to compare the source codes before and after the compilation, is simple to implement, and ensures the accuracy and reliability of identification.

BRIEF DESCRIPTION OF DRAWINGS

To illustrate the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure more comprehensible, the following further describes the present disclosure in detail with reference to the accompanying drawings and embodiments. It is understandable that, the specific embodiment is only used to explain the present disclosure and is not intended to limit the present disclosure.

Figure 1:
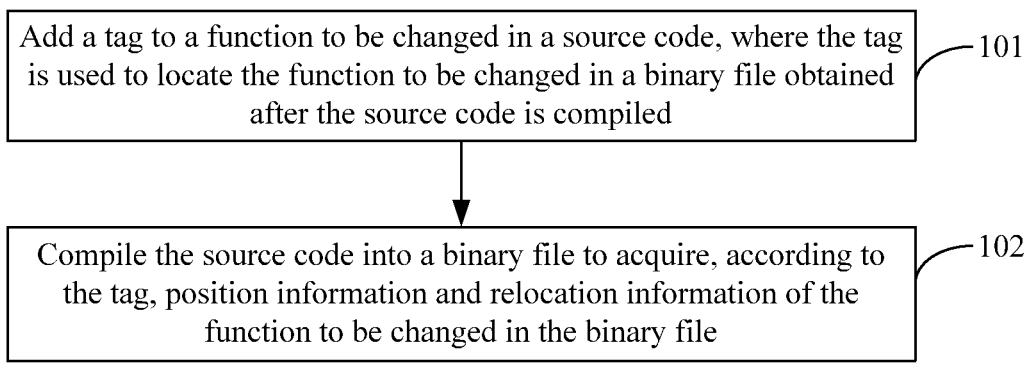
FIG. 1 is a flowchart of a method for detecting a code change according to an embodiment of the present disclosure.

FIG. 1 is a flowchart of a method for detecting a code change according to an embodiment of the present disclosure. The method includes the following steps.

Step 101: Add a tag to a function to be changed in a source code, where the tag is used to locate the function to be changed in a binary file obtained after the source code is compiled.

In the embodiment of the present disclosure, a program is formed by the source code, but problems often occur during running of the program. Once a problem occurs, the problem needs to be corrected. A patch file is a file used to correct the problems in the program formed by the source code. The patch file generally replaces or modifies one segment or a plurality of segments of functions (the function to be changed) in the source code. Therefore, position information of the function to be changed needs to be acquired. The specific method for adding the tag is as follows:

a. A tag including an external interface is created, where the tag is a code or a macro for extracting information.

In the embodiment of the present disclosure, a tag creator can create a tag in a plurality of manners. The tag includes but is not limited to a code with a special effect or a macro for extracting information. The tagged function to be changed can be detected by using the code. The created tag further includes an interface added to the function to be changed.

b. The tag is added to the function to be changed in the source code by using the external interface.

In the embodiment of the present disclosure, the process of adding a tag to the function to be changed may be performed manually or be added automatically by using a tool.

Step S102: Compile the source code into a binary file to acquire, according to the tag, position information and relocation information of the function to be changed in the binary file.

In the embodiment of the present disclosure, the source code is compiled into a binary file; and the position information and the relocation information of the function to be changed in the binary file are acquired through analysis. For details about the specific implementation process, refer to FIG. 2 and the description of FIG. 2.

In the embodiment of the present disclosure, a tag is added to a function to be changed, a source code is compiled into a binary file, and position information and relocation information of the function to be changed in the binary file are acquired by using the tag, so that in subsequent operations, a hot patch file modifies the function to be changed in the software according to the position information and the relocation information. This is not only technologically simple to implement, but also eliminates the need to compare the source codes before and after the compilation.

Figure 2:
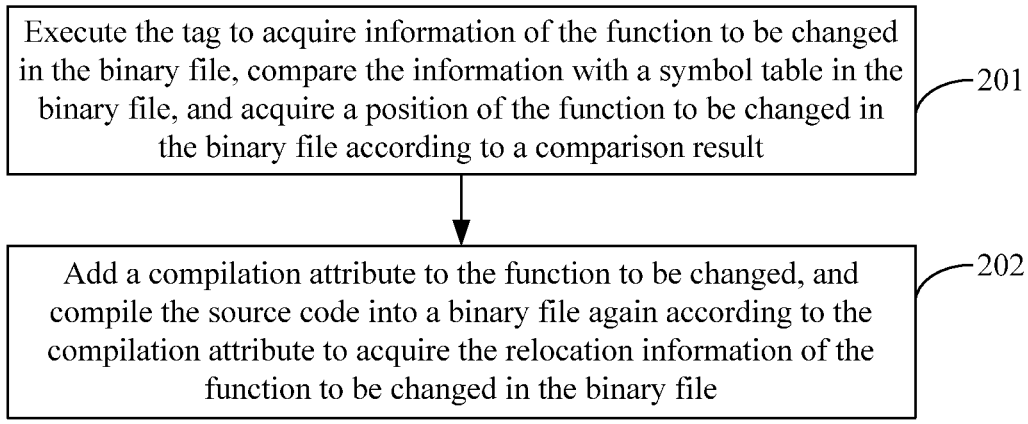
FIG. 2 is a flowchart of a specific implementation of step S102 according to Embodiment 1 of the present disclosure.

FIG. 2 is a flowchart of a specific implementation of step 102 according to Embodiment 1 of the present disclosure, including the following:

Step 201: Execute the tag to acquire information of the function to be changed in the binary file, compare the information with a symbol table in the binary file, and acquire the position information of the function to be changed in the binary file according to a comparison result, where the information includes a function name of the function to be changed in the binary file or a start address of the function to be changed in the binary file.

In the embodiment of the present disclosure, after the source code is compiled into the binary file, the function to be changed in the source code generates corresponding information, and the tag records the information. The information may be acquired by executing the tag. The information is compared with the symbol table in the binary file, and the position of the function to be changed in the binary file is acquired according to the comparison result, where the information includes the function name of the function to be changed in the binary file or the start address of the function to be changed in the binary file. Because a corresponding relationship exists between the function name and the start address in the symbol table, after one of the two is acquired, the other one can be acquired accordingly. The position of the function to be changed in the binary file can be determined according to the function name and the start address. The comparing of the information with a symbol table in the binary file includes: a. if the information is the function name of the function to be changed in the binary file, comparing the function name of the function to be changed in the binary file with the symbol table in the binary file to acquire the start address of the function to be changed in the binary file; and b. if the information does not include the function name, comparing the start address of the function to be changed in the binary file with the symbol table in the binary file.

After the foregoing comparison process ends, the function name and the start address of the function to be changed in the binary file can be acquired, where the acquired function name and start address are the position information of the function to be changed in the binary file.

Step 202: Add a compilation attribute to the function to be changed, where the added compilation attribute is used to store the function to be changed in an independent segment of the binary file, and compile the source code into a binary file again according to the compilation attribute to acquire the relocation information of the function to be changed in the binary file.

In the embodiment of the present disclosure, the compilation attribute used to store the function to be changed in an independent segment of the binary file is added to the function to be changed, and the source code is compiled again to acquire the relocation information of the function to be changed in the source code which is compiled into the binary file.

For example, the following describes how to detect a code change by using a Linux apparatus as an example.

1. A patch developer creates a tag including an external interface, where the tag is a code or a macro for extracting information.

2. The tag is manually or automatically added to the function to be changed in the source code by using the external interface.

3. The source code is compiled into a binary file by using such compilers as a GNU C Compiler (GCC).

4. An information reading tool is invoked to read the binary file, and a segment of the binary file storing the tag is analyzed to acquire the function name of the function to be changed in the binary file, the start address of the function to be changed in the binary file, and a length of the function to be changed.

5. The function name or the start address of the function to be changed in the binary file is compared with the symbol table in the binary file, and an address of the function to be changed in the binary file is acquired according to a comparison result.

6. The compilation attribute used to store the function to be changed in an independent segment of the binary file is added to the source code.

7. The source code is compiled into the binary file again to acquire the relocation information of the function to be changed in the binary file.

Figure 3:
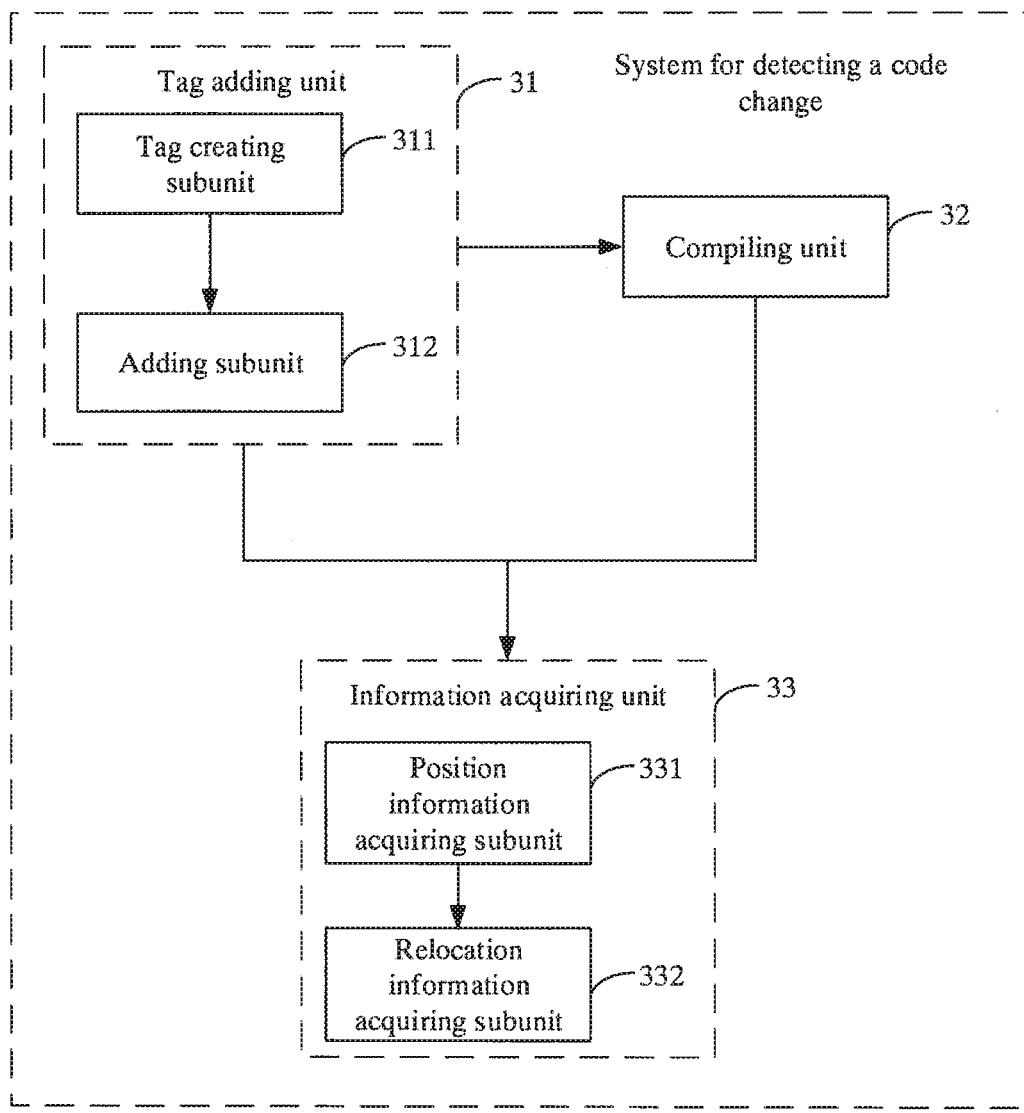
FIG. 3 is a structural diagram of an apparatus for detecting a code change according to an embodiment of the present disclosure.

FIG. 3 is a structural diagram of an apparatus for detecting a code change according to an embodiment of the present disclosure. For the convenience of description, only parts related to the embodiment of the present disclosure are shown in FIG. 3, including a tag adding unit 31, configured to add a tag to a function to be changed in a source code, where the tag is used to locate the function to be changed in a binary file obtained after the source code is compiled, where the binary file is a compiled source code; a compiling unit 32, configured to compile the source code with the tag added by the tag adding unit 31 into a binary file; and an information acquiring unit 33, configured to acquire, according to the tag added by the tag adding unit 31, position information and relocation information of the function to be changed in the binary file compiled by the compiling unit 32.

In the embodiment of the present disclosure, a program is formed by the source code, but problems often occur during running of the program. Once a problem occurs, the problem needs to be corrected. A patch file is a file used to correct the problems in the program formed by the source code. The patch file generally replaces or modifies one segment or a plurality of segments of functions (the function to be changed) in the source code. Therefore, position information of the function to be changed needs to be acquired. The tag adding unit 31 includes a tag creating subunit 311, configured to create a tag including an external interface, where the tag is a code or a macro for extracting information; and an adding subunit 312, configured to add, by using the external interface, the tag created by the tag creating subunit 311 to the function to be changed in the source code. In the embodiment of the present disclosure, the tag creating subunit 311 can create a tag in a plurality of manners. The tag includes but is not limited to a code with a special effect or a macro for extracting information, and the tagged function to be changed can be detected by using the code. The created tag further includes an external interface added to the function to be changed.

In the embodiment of the present disclosure, the process of adding a tag to the function to be changed may be performed manually or be added automatically by using a tool.

In the embodiment of the present disclosure, the source code is compiled into a binary file, and the position information and the relocation information of the function to be changed in the binary file are acquired through analysis. The information acquiring unit 33 includes a position information acquiring subunit 331 and a relocation information acquiring subunit 332. The position information acquiring subunit 331, configured to acquire, by using the tag, information of the function to be changed in the binary file, compare the information with a symbol table in the binary file, and acquire, according to a comparison result, the position information of the function to be changed in the binary file, where the information includes a function name of the function to be changed in the binary file or a start address of the function to be changed in the binary file.

In the embodiment of the present disclosure, after the source code is compiled into the binary file, the function to be changed in the source code generates corresponding information, and the tag records the information. The information may be acquired by executing the tag. The information is compared with the symbol table in the binary file, and the position of the function to be changed in the binary file is acquired according to the comparison result, where the information includes the function name of the function to be changed in the binary file or the start address of the function to be changed in the binary file. Because a corresponding relationship exists between the function name and the start address in the symbol table, after one of the two is acquired, the other one can be acquired accordingly. The position of the function to be changed in the binary file can be determined according to the function name and the start address. The comparing, by the position information acquiring subunit 331, the information with a symbol table in the binary file, and acquiring, according to the comparison result, the position information of the function to be changed in the binary file is specifically implemented in the following manners: a. if the information acquired by using the tag is the function name of the function to be changed in the binary file, comparing the function name of the function to be changed in the binary file with the symbol table in the binary file to acquire the start address of the function to be changed in the binary file; b. if the information acquired by using the tag is the start address of the function to be changed in the binary file, comparing the start address of the function to be changed in the binary file with the symbol table in the binary file to acquire the function name of the function to be changed in the binary file; and c. determining the acquired function name and start address as the position information of the function to be changed in the binary file. The relocation information acquiring subunit 332, configured to add a compilation attribute to the function to be changed, where the added compilation attribute is used to store the function to be changed in an independent segment of the binary file, and compile, according to the compilation attribute, the source code into a binary file again to acquire the relocation information of the function to be changed in the binary file.

In the embodiment of the present disclosure, the compilation attribute used to store the function to be changed in an independent segment of the binary file is added to the function to be changed, and the source code is compiled again to acquire the relocation information of the function to be changed in the source code which is compiled into the binary file. This is not only technologically simple to implement, but also eliminates the need to compare the source codes before and after the compilation.

Figure 4:
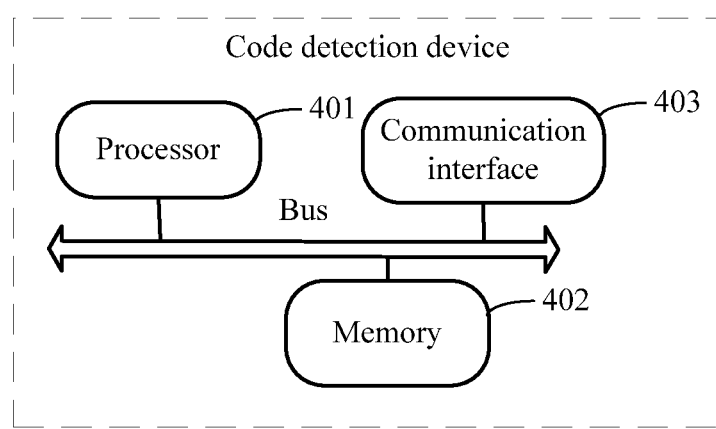
FIG. 4 is a structural diagram of a device for detecting a code change according to an embodiment of the present disclosure.

FIG. 4 is a structural diagram of a device for detecting a code change according to an embodiment of the present disclosure. As shown in FIG. 4, the device for detecting a code change that is provided in this embodiment includes at least one processor 401, a memory 402, a communication interface 403, and a bus. The processor 401, the memory 402, and the communication interface 403 are connected over the bus and implement mutual communication over the bus. The bus may be an industry standard architecture (ISA) bus, a peripheral component interconnect (PCI) bus, an extended industry standard architecture (EISA) bus, and the like. The bus may be classified into an address bus, a control bus, and the like. For the convenience of representation, the bus in FIG. 4 is represented by using a bold line only, but it does not mean that there is only one bus or one type of bus.

The memory 402 is configured to store an executable program code, where the program code includes a computer operation instruction. The memory 402 may include a high speed random access memory (RAM), and may also include a non-volatile memory, for example, at least one magnetic memory.

In an embodiment, the processor 401 runs by reading the executable program code stored in the memory 402, a program corresponding to the executable program code to: add a tag to a function to be changed in a source code, where the tag is used to locate the function to be changed in a binary file obtained after the source code is compiled; and compile the source code into a binary file to acquire, according to the tag, position information and relocation information of the function to be changed in the binary file.

In another embodiment, the processor 401 runs by reading the executable program code stored in the memory 402, a program corresponding to the executable program code to create a tag including an external interface, where the tag is a code or a macro for extracting information; and add, by using the external interface, the tag to the function to be changed in the source code.

In another embodiment, the processor 401 runs by reading the executable program code stored in the memory 402, a program corresponding to the executable program code to execute the tag to acquire information of the function to be changed in the binary file, compare the information with a symbol table in the binary file, and acquire, according to a comparison result, the position information of the function to be changed in the binary file, where the information includes a function name of the function to be changed in the binary file or a start address of the function to be changed in the binary file; and add a compilation attribute to the function to be changed, where the added compilation attribute is used to store the function to be changed in an independent segment of the binary file, and compile, according to the compilation attribute, the source code into a binary file again to acquire the relocation information of the function to be changed in the binary file.

In another embodiment, the processor 401 runs by reading the executable program code stored in the memory 402, a program corresponding to the executable program code to, if the information is the function name of the function to be changed in the binary file, compare the function name of the function to be changed in the binary file with a symbol table in the binary file to acquire the start address of the function to be changed in the binary file; and if the information is the start address of the function to be changed in the binary file, compare the start address of the function to be changed in the binary file with the symbol table in the binary file to acquire the function name of the function to be changed in the binary file.

The processor 401 may be a central processing unit (CPU), or be an application specific integrated circuit (ASIC), or be configured as one or a plurality of integrated circuits in the embodiment of the present disclosure.

It should be noted that, besides the foregoing functions, the processor 401 may be further configured to perform other processes in the foregoing method embodiment, which is not further described herein.

The communication interface 403 is mainly configured to implement traffic in this embodiment to determine communication between a device and other devices or apparatuses.

The foregoing descriptions are merely exemplary embodiments of the present disclosure, but are not intended to limit the present disclosure. Any modification, equivalent replacement, and improvement made within the spirit and principle of the present disclosure should fall within the protection scope of the present disclosure.

What is claimed is:

1. A method implemented for executing computer instructions stored in a memory for detecting a code change, comprising:
adding a tag to a function to be changed in a source code, wherein the tag is used to locate the function to be changed in a binary file obtained after the source code is compiled, and wherein the tag comprises a code or a macro for extracting information, and the tag further comprises an external interface; and compiling the source code into the binary file to acquire, according to the tag, position information and relocation information of the function to be changed in the binary file, wherein acquiring, according to the tag, position information of the function to be changed in the binary file comprises:

executing the tag to acquire information of the function to be changed in the binary file, wherein the information of the function to be changed comprises a function name of the function to be changed in the binary file or a start address of the function to be changed in the binary file;

comparing the information with a symbol table in the binary file; and acquiring, according to a comparison result, the position information of the function to be changed in the binary file.

2. The method according to claim 1, wherein acquiring, according to the tag, relocation information of the function to be changed in the binary file comprises:

adding a compilation attribute to the function to be changed, wherein the added compilation attribute is used to store the function to be changed in an independent segment of the binary file; and compiling, according to the compilation attribute, the source code into the binary file again to acquire the relocation information of the function to be changed in the binary file.

3. The method according to claim 1, wherein comparing the information with the symbol table in the binary file, and acquiring, according to a comparison result, the position information of the function to be changed in the binary file comprises:

comparing the function name of the function to be changed in the binary file with the symbol table in the binary file to acquire the start address of the function to be changed in the binary file when the information is the function name of the function to be changed in the binary file;

comparing the start address of the function to be changed in the binary file with the symbol table in the binary file to acquire the function name of the function to be changed in the binary file when the information is the start address of the function to be changed in the binary file; and using the function name and the start address of the function to be changed in the binary file as the position information of the function to be changed in the binary file.

4. The method according to claim 1, wherein the tag is added to the function to be changed in the source code using the external interface.

5. An apparatus having executable instructions stored in a memory for detecting a code change, comprising:

a tag adding unit stored in the memory and configured to add a tag to a function to be changed in a source code, wherein the tag is used to locate the function to be changed in a binary file obtained after the source code is compiled, and wherein the tag is a code or a macro for extracting information, and the tag further comprises an external interface;

a compiling unit stored in the memory and configured to compile the source code with the tag added by the tag adding unit into the binary file; and an information acquiring unit stored in the memory and configured to:

acquire information of the function to be changed in the binary file using the tag, wherein the information of the function to be changed in the binary file comprises a function name of the function to be changed in the binary file or a start address of the function to be changed in the binary file;

compare the information with a symbol table in the binary file; and acquire, according to a comparison result, the position information of the function to be changed in the binary file.

6. The apparatus according to claim 5, wherein the information acquiring unit is further configured to:

add a compilation attribute to the function to be changed, wherein the added compilation attribute is used to store the function to be changed in an independent segment of the binary file; and compile, according to the compilation attribute, the source code into the binary file again to acquire the relocation information of the function to be changed in the binary file.

7. The apparatus according to claim 5, wherein the information acquiring unit is further configured to:

compare the function name of the function to be changed in the binary file with the symbol table in the binary file to acquire the start address of the function to be changed in the binary file when the information acquired using the tag is the function name of the function to be changed in the binary file;

compare the start address of the function to be changed in the binary file with the symbol table in the binary file to acquire the function name of the function to be changed in the binary file when the information acquired using the tag is the start address of the function to be changed in the binary file; and use the function name and the start address of the function to be changed in the binary file as the position information of the function to be changed in the binary file.

8. The apparatus according to claim 5, wherein the tag is added to the function to be changed in the source code using the external interface.

9. A method implemented for executing computer instructions stored in a memory for detecting a code change, comprising:

adding a tag to a function to be changed in a source code, wherein the tag is used to locate the function to be changed in a binary file obtained after the source code is compiled, wherein the tag comprises a code or a macro for extracting information, and the tag further comprises an external interface, and wherein the tag is added to the function to be changed in the source code using the external interface; and compiling the source code into the binary file to acquire, according to the tag, position information and relocation information of the function to be changed in the binary file, wherein acquiring, according to the tag, position information of the function to be changed in the binary file comprises:

executing the tag to acquire information of the function to be changed in the binary file, wherein the information of the function to be changed comprises a function name of the function to be changed in the binary file or a start address of the function to be changed in the binary file;

comparing the information with a symbol table in the binary file; and acquiring, according to a comparison result, the position information of the function to be changed in the binary file.

10. The method according to claim 9, wherein acquiring, according to the tag, relocation information of the function to be changed in the binary file comprises:
  adding a compilation attribute to the function to be changed, wherein the added compilation attribute is used to store the function to be changed in an independent segment of the binary file; and
  compiling, according to the compilation attribute, the source code into the binary file again to acquire the relocation information of the function to be changed in the binary file.

11. The method according to claim 9, wherein comparing the information with the symbol table in the binary file, and acquiring, according to a comparison result, the position information of the function to be changed in the binary file comprises:
  comparing the function name of the function to be changed in the binary file with the symbol table in the binary file to acquire the start address of the function to be changed in the binary file when the information is the function name of the function to be changed in the binary file;
  comparing the start address of the function to be changed in the binary file with the symbol table in the binary file to acquire the function name of the function to be changed in the
  binary file when the information is the start address of the function to be changed in the binary file; and
  using the function name and the start address of the function to be changed in the binary file as the position information of the function to be changed in the binary file.

\* \* \* \* \*